S. S. WEAVER.
STEERING MECHANISM.
APPLICATION FILED MAR. 20, 1916.
1,223,913.
Patented Apr. 24, 1917.
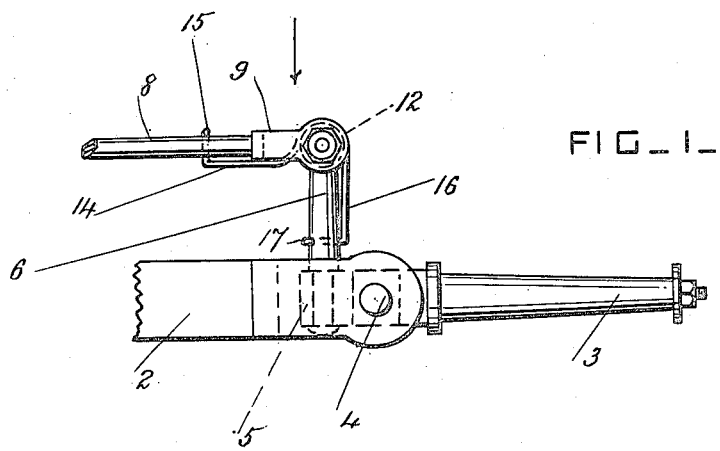
FIG_1_
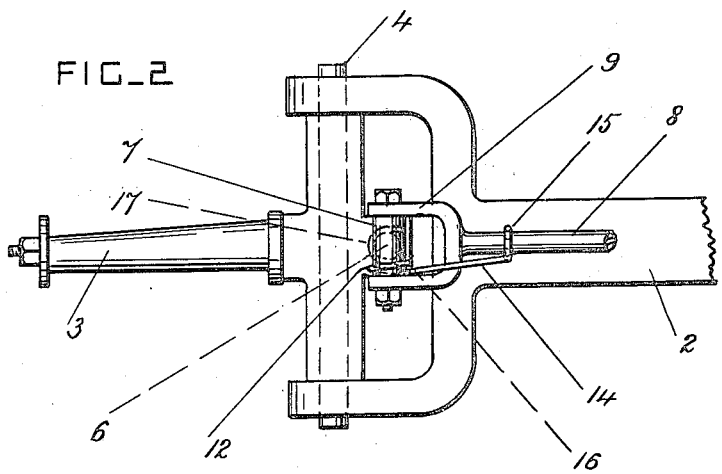
FIG_2_
FIG_3_
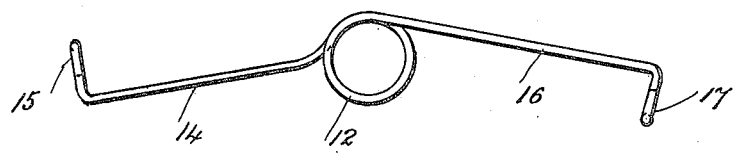
Inventor.
Scott S. Weaver
by Herbert W. Jenner.
Attorney

UNITED STATES PATENT OFFICE.

SCOTT S. WEAVER, OF TAMPA, FLORIDA.

STEERING MECHANISM.

1,223,913.

Specification of Letters Patent.

Patented Apr. 24, 1917.

Application filed March 20, 1916. Serial No. 85,319.

*To all whom it may concern:*

Be it known that I, SCOTT S. WEAVER, a citizen of the United States, residing at Tampa, in the county of Hillsborough and State of Florida, have invented certain new and useful Improvements in Steering Mechanism; and I do hereby declare the following to be a full, clear, and exact description of the invention, such as will enable others skilled in the art to which it appertains to make and use the same.

This invention relates to the steering mechanism on the front axles of motor cars; and it consists of a spring device connected to the pivoted axle spindle as hereinafter fully described and claimed.

In the drawings: Figure 1 is a plan view of a portion of a steering mechanism provided with a spring device according to this invention. Fig. 2 is a rear view of the same looking in the direction of the arrow in Fig. 1. Fig. 3 is a detail plan view of the spring device.

Each end portion of the axle is provided with a similar spring device, and as they only differ from each other in being made right and left, only one is shown in the drawings.

The front axle 2 of the motor car is provided with a spindle 3 for the front ground wheel to run on, and this spindle is pivoted to the end portion of the axle by a pin 4. The spindle has a lug or extension 5 on the opposite side of its pivot from its main portion. An arm 6 is provided and projects from the lug 5 at a right angle to the spindle axis, and 8 is a connecting-rod having a forked end portion 9 which is pivoted to an eye 7 on the free end portion of the arm 6 by a pin 10. The connecting-rod extends across the car frame, and is pivoted to a similar spindle arm at the other end portion of the axle. All the above-mentioned parts are of any approved construction, and may be variously modified according to the different makes of motor cars.

The novel spring device is formed of a stout wire or small rod of spring metal, and it is provided with a helical coil 12 at its middle part, and this coil has straight arms 14 and 16 at its ends.

The arm 14 has a laterally projecting hook 15 at its free end, and the arm 16 has a similar hook 17 except that it is bent or arranged in the reverse direction from the hook 15. This spring device is applied to the pivoted joint by slipping the hook 15 and arm 14 through the forked portion 9 of the connecting-rod, as far as the coil will permit, and then hooking the hook 15 over the rear side of the connecting-rod. The helical coil 12 is then slipped over the eye 7 where it projects laterally of the arm, and the eye is then connected to the rod 8 by the pin 10. The other arm of the spring device is then moved around forcibly toward the arm 6, and its hook 17 is sprung into engagement with the arm 6.

This spring device prevents the joint to which it is applied from rattling; it helps to keep the car straight ahead in the road, and it also helps the driver to right the car after making a turn; and it also saves the tires of the road wheels and the bearings and the bushes of the wheel spindles from wear, by holding the steering wheels to a straight course on the road.

What I claim is:

The combination, with a pivoted axle spindle having an operating arm provided with an eye having a projecting portion, and a connecting-rod having a forked end portion which is pivoted to the said eye; of a spring formed of a single piece of spring metal having a coil at its middle part which encircles the projecting portion of the said eye and which is arranged in the forked portion of the connecting-rod and to one side of the said arm, said coil terminating in arms having hooks which are bent around in the same direction and which project laterally from the said arms in the same general plane as the said coil but in opposite directions and which are sprung into engagement with the connecting-rod and operating arm respectively.

In testimony whereof I have affixed my signature.

SCOTT S. WEAVER.